(12) United States Patent
Luebbers

(10) Patent No.: US 7,261,911 B2
(45) Date of Patent: Aug. 28, 2007

(54) ASEPTICALLY PACKAGED, EXTENSIVELY HYDROLYZED, LIQUID NUTRITIONAL FORMULA AND METHOD FOR MAKING IT

(76) Inventor: Steven T. Luebbers, 1300 Pepperell Dr., Columbus, OH (US) 43235

( * ) Notice: Subject to any disclaimer, the term of this patent is extended or adjusted under 35 U.S.C. 154(b) by 597 days.

(21) Appl. No.: 10/706,152

(22) Filed: Nov. 12, 2003

(65) Prior Publication Data
US 2004/0142017 A1    Jul. 22, 2004

Related U.S. Application Data

(60) Provisional application No. 60/434,887, filed on Dec. 19, 2002.

(51) Int. Cl.
*A23L 1/303* (2006.01)
(52) U.S. Cl. .......................... 426/73; 426/72; 426/399; 426/521; 426/634; 426/656
(58) Field of Classification Search ................ 426/634, 426/656, 399, 72, 521, 73
See application file for complete search history.

(56) References Cited

U.S. PATENT DOCUMENTS

| 4,670,286 A |   | 6/1987  | Mahmoud       |         |
|-------------|---|---------|---------------|---------|
| 4,935,257 A |   | 6/1990  | Yajima        |         |
| 5,153,012 A |   | 10/1992 | Ohtaka et al. |         |
| 5,204,134 A | * | 4/1993  | Girsh         | 426/580 |
| 5,382,439 A |   | 1/1995  | Hill et al.   |         |
| 5,456,926 A |   | 10/1995 | Hill et al.   |         |
| 5,480,872 A | * | 1/1996  | Cope et al.   | 514/21  |
| 5,589,357 A |   | 12/1996 | Martinez et al. |       |
| 6,096,358 A |   | 8/2000  | Murdick et al. |        |
| 6,436,464 B1 |  | 8/2002  | Euber         |         |
| 2002/0160081 A1 | | 10/2002 | Tiano et al. |        |
| 2004/0062849 A1 | * | 4/2004 | Lien et al.  | 426/629 |

FOREIGN PATENT DOCUMENTS

| EP | 0 603 726 A2 | 12/1993 |
| EP | 0 887 023 A2 | 12/1998 |
| EP | 1 048 226 A1 | 11/2000 |
| EP | 1 062 873 A1 | 12/2000 |
| JP | 10-210951    | 8/1998  |
| WO | WO 00/65934  | 11/2000 |

OTHER PUBLICATIONS

Inspection Report I.D. Jul. 28-Aug. 6, 1997 MRC/DBW Nestle USA, Nutrition Division—Summary of Findings.

* cited by examiner

*Primary Examiner*—Helen Pratt
(74) *Attorney, Agent, or Firm*—William J. Winter; Sandra E. Weida; Thomas D. Brainard

(57) ABSTRACT

Disclosed are sterilized, aseptically packaged, liquid nutritional formulas, and corresponding methods of making the formulas, wherein the formulas comprise Vitamin D and extensively hydrolyzed protein having a degree of hydrolysis of at least about 20%, and wherein the packaged formula is prepared by (a) sterilizing a liquid nutritional formula containing Vitamin D and extensively hydrolyzed protein having a degree of hydrolysis of at least about 20%; (b) sterilizing a container; and then (c) aseptically packaging the sterilized liquid nutritional formula in the sterilized container. The packaged formulas exhibit improved Vitamin D stability.

27 Claims, No Drawings

ASEPTICALLY PACKAGED, EXTENSIVELY HYDROLYZED, LIQUID NUTRITIONAL FORMULA AND METHOD FOR MAKING IT

CROSS REFERENCE

This application is related to the An Aseptically Packaged, Extensively Hydrolyzed, Liquid Nutritional Formula and Method for Making It which was filed as Ser. No. 60/434,887 on Dec. 19, 2002

FIELD OF THE INVENTION

The present invention relates to an aseptically packaged, liquid nutritional formula, and a method of making the formula, comprising Vitamin D and extensively hydrolyzed protein. The packaged formula provides improved Vitamin D shelf-life stability.

BACKGROUND

Vitamin D (i.e., Vitamin $D_3$) is a fat-soluble vitamin produced from ergosterol and 7-dehydrocholesterol following exposure to sunlight. Vitamin D is also easily obtainable from foods, including Vitamin D enriched foods such as milk, and from vitamin supplements. Another excellent source of Vitamin D for infants, and sometimes the sole source, is infant formulas that have been fortified with Vitamin D.

The benefits of Vitamin D are well documented and accepted. Such benefits include regulation of calcium in the body, and coordination of the deposit of calcium and phosphorous into the bone. Vitamin D and other vitamins are often added to various nutritional products, including infant and adult nutritional formulas. In addition to the Vitamin D and other vitamin supplements in such formulas, these products typically also contain a balance of carbohydrate, lipid, and protein nutrients, the latter of which is most often supplied and consumed in the form of common intact proteins.

Some people, however, exhibit allergies or sensitivities to intact proteins, i.e. whole proteins, such as those in intact cow's milk protein or intact soy protein isolate-based formulas. While such sensitivities are more common in infants than in children over one year of age or adults, there are still some people over the age of one with these sensitivities. Many of these people with protein allergies or sensitivities are able to tolerate extensively hydrolyzed protein. Hydrolysate formulas (also referred to as semi-elemental formulas) contain protein that has been hydrolyzed or broken down into short peptide fragments and amino acids and as a result is more easily digested. In people with protein sensitivities or allergies, immune system associated allergies or sensitivities often result in cutaneous, respiratory or gastrointestinal symptoms such as vomiting and diarrhea. People who exhibit reactions to intact protein formulas often will not react to extensively hydrolyzed protein formulas because their immune system does not recognize the hydrolyzed protein as the intact protein that causes their symptoms.

Nutritional guidelines for infant formulas can be found in the Infant Formula Act, 21 United States Code (U.S.C.) Section 350(a). This Act currently specifies that the maximum allowable amount of Vitamin D in an infant formula is 676 I.U. per liter, and the minimum allowable amount of Vitamin D is 274 I.U. per liter, the range being based upon a standard 20 calorie/ounce formula. (equivalent I.U./liter ranges must be adjusted for other base infant formulas, e.g. 24 calorie/ounce).

To meet the Vitamin D requirements of the Infant Formula Act, the amount of Vitamin D in an infant formula must fall somewhere between the minimum and maximum for the entire shelf-life of the formula. For example, currently available Similac☐ with Iron (available from Ross Products Division of Abbott Laboratories, Columbus, Ohio) has a label value of 60 I.U. of Vitamin D per 100 kcal or 148 milliliters of formula, corresponding to approximately 405 I.U. of Vitamin D per liter.

It is generally known, however, that Vitamin D degrades and concentrations decline after packaging and when used in combination with extensively hydrolyzed protein in a liquid nutritional formula. This rapid degradation, which will generally occur throughout the shelf-life of the liquid nutritional formula, creates a challenge for the formulator in providing a finished product with acceptable Vitamin D concentrations over the desired shelf-life of the product. This Vitamin D shelf-life stability problem is described in U.S. Pat. No. 5,456,926 (Hill et al.), which description is incorporated herein by reference.

One method of improving the shelf-life stability of Vitamin D in a liquid nutritional formula is described in U.S. Pat. No. 5,456,926 (Hill et al.) which teaches the addition of Vitamin C to a liquid nutritional formula, before or after a preliminary heat treatment, at a concentration exceeding 300 mg per liter such that the initial concentration of Vitamin C will be at least 300 mg per liter during the shelf-life of the liquid nutritional product.

Yet another method of addressing the shelf-life stability of Vitamin D in a liquid nutritional formula containing extensively hydrolyzed protein involves over-fortification with Vitamin D during processing, i.e., prior to packaging. In other words, enough Vitamin D is added during formulation to compensate for the anticipated degradation and loss of Vitamin D during the packaged shelf-life of the liquid nutritional product. This method, however, is limiting in that it does not effectively slow down Vitamin D degradation after packaging, and care must therefore be taken during the over-fortification step to avoid excessive Vitamin D concentrations in the initially marketed product.

It has now been found, however, that the shelf-life stability of Vitamin D can be improved even when formulated in the presence of extensively hydrolyzed protein in a liquid nutritional formula, provided that the formula is aseptically packaged in accordance with the methods described hereinafter. It has been found that such aseptic packaging methods when applied to these formulas provide for improved Vitamin D shelf-life stability as compared to other similar formulas packaged in accordance with more conventional retort packaging methods.

Although aseptically packaged liquid nutritional formulations are known in the literature, some of which are also marketed and available to consumers, including infant nutritional formulas, none of these formulations are believed to contain hydrolyzed protein or extensively hydrolyzed protein with a sufficient degree of hydrolysis (i.e., at least about 20%,) that would otherwise greatly accelerate Vitamin D degradation. Non-limiting examples of these prior art formulations include Similac☐ with Iron, Isomil☐ Soy Formula with Iron, and Ensure7, all of which are available from Ross Products Division of Abbott Laboratories, Columbus, Ohio, U.S.A. (all contain intact protein). Other aseptically packaged formulas include Neocate® One Elemental Liquid Nutrition (contains non-hydrolyzed amino acids) and Good Start Infant Formula, available from Nestle USA, Eau Claire, Wis., U.S.A. (contains hydrolyzed protein but with a degree of hydrolysis less than about 20%). .

SUMMARY OF THE INVENTION

The present invention is directed to a sterilized, aseptically packaged, liquid nutritional formula comprising Vitamin D and extensively hydrolyzed protein, wherein the packaged formula is prepared by (a) sterilizing a liquid nutritional formula containing Vitamin D and extensively hydrolyzed protein, said protein being defined by a degree of hydrolysis of at least about 20%; (b) sterilizing a container; and then (c) aseptically packaging the sterilized liquid nutritional formula in the sterilized container, to produce a sterilized, aseptically packaged, liquid nutritional formula containing extensively hydrolyzed protein and Vitamin D.

The present invention is also directed to an aseptically packaged composition comprising a liquid nutritional formula containing Vitamin D and extensively hydrolyzed protein, wherein the extensively hydrolyzed protein is defined by a degree of hydrolysis of at least about 20%.

The present invention is also directed to a method for improving the shelf-life stability of Vitamin D in an extensively hydrolyzed protein liquid nutritional formula packaged in a container. The method comprises the steps of (a) sterilizing a liquid nutritional formula containing Vitamin D and extensively hydrolyzed protein having a degree of hydrolysis of at least about 20%; (b) sterilizing a container; and then (c) aseptically packaging the sterilized liquid nutritional formula in the sterilized container, to produce a sterilized, aseptically packaged, liquid nutritional formula containing extensively hydrolyzed protein and Vitamin D.

It has been found that the sterilized, aseptically packaged, liquid nutritional formula of the present invention exhibits improved shelf-life stability of Vitamin D even though the packaged formula contains extensively hydrolyzed protein having a degree of hydrolysis of at least about 20%. It is generally known that extensively hydrolyzed protein compositions, when used in combination with Vitamin D, will accelerate Vitamin D degradation. It has been found, however, that when an extensively hydrolyzed protein liquid nutritional formula, as described herein, is produced in accordance with the methods also described herein, the formula will exhibit unexpected and exceptional shelf-life stability as it relates to its Vitamin D content.

It was unexpectedly found that when an extensively hydrolyzed protein formula with a degree of protein hydrolysis of at least 20% is aseptically packaged, it experiences improved shelf-life stability of Vitamin D (i.e., reduced shelf-life degradation) relative to the shelf-life stability of Vitamin D when same or similar formula is packaged by more conventional retort packaging methods. It has been found that the sterilized, aseptically packaged, liquid nutritional formulas of the present invention exhibit a shelf-life Vitamin D degradation rate reduction (as defined hereinafter), preferably from about 20% to about 40%, more preferably about 25% to about 35%, as compared to that of a baseline extensively hydrolyzed protein liquid nutritional formula subjected to conventional retort packaging methods.

DETAILED DESCRIPTION

The sterilized, aseptically packaged, liquid nutritional formula of the present invention is directed to an essential combination of Vitamin D and extensively hydrolyzed protein, wherein the packaged formula is preferably prepared in accordance with defined aseptic packaging or processing steps. Each of these components and processing steps is described in detail hereinafter.

The term "shelf-life stability" as used herein refers to the Vitamin D degradation or loss rate in a liquid nutritional formula after such a formula is packaged. "Shelf-life" stability as used herein is distinguished from "processing stability" in that the latter pertains to the formula prior to and during packaging, whereas "shelf-life stability" pertains to the formula after packaging, i.e., during the shelf-life of the selected product.

The liquid nutritional formula for use in the methods and compositions of the present invention are in liquid or semi-liquid form (preferably liquid form) under ambient conditions, and specifically excludes solid formulations such as bars, flowable powders or granules, or other non-liquid product forms.

The terms "sterile" and "sterilized" are used interchangeably herein and mean commercially sterile as this latter term is understood by one of ordinary skill in the formulation arts.

The term "nutritional" as used herein refers to those formulas that are capable of meeting the primary or sole nutritional needs of the pediatric or adult consumer to which the referenced nutritional formula is directed. It is understood, however, that such nutritional formulas can optionally be used as a dietary supplement and not as a primary or sole nutritional source.

The liquid nutritional formula of the present invention must contain a combination of Vitamin D and extensively hydrolyzed protein, but can otherwise be prepared for use in the method of the present invention by formulation or manufacturing methods well known to those of ordinary skill in the art for making liquid nutritional products. Once prepared in accordance with such well known methods, the liquid nutritional formula is then aseptically packaged as described herein in a suitable container, preferably a plastic or other non-metal container, more preferably in a multi-dose or resealable plastic or other non-metal package.

The present invention is directed to a liquid nutritional formula and method of making the formula, wherein the composition provides improved shelf-life stability of Vitamin D in the presence of the extensively hydrolyzed protein component in the formula. The increased shelf-life stability amounts to a reduced rate of Vitamin D degradation after packaging as compared to a baseline extensively hydrolyzed protein liquid nutritional formula. The nutritional formula may be a pediatric formula or an adult formula. For pediatric formulas, the formula may be used with infants, i.e. children less than one year of age, or children over one year of age.

It was unexpectedly found that the rate of vitamin D degradation in an aseptically packaged, extensively hydrolyzed protein liquid nutritional formula was decreased as compared to the Vitamin D degradation rate of the same formula in a retort packaged, extensively hydrolyzed protein liquid nutritional formula (the baseline). The decreased rate of Vitamin D degradation is calculated by comparing the Vitamin D degradation rates between an extensively hydrolyzed protein liquid nutritional formula packaged in an aseptic package and a baseline formula, the baseline formula being the same formula but packaged by a conventional retort packaging method.

It has been found that the compositions and methods of the present invention can reduce Vitamin D shelf-life degradation rates relative to a baseline formula, preferably from about 20% to about 40%, more preferably from about 25% to about 35%.

Vitamin D concentrations in the aseptically packaged liquid nutritional formulas herein should be safe and effective for the intended use. For many liquid nutritional formulas, especially infant formulas, the concentration should ideally adhere to any regional guidelines for the selected formula in the defined user population. For example, in the United States, nutritional guidelines for most infant formulas are set forth in the Infant Formula Act, 21 United States Code (U.S.C.) Section 350(a). This Act currently specifies that the maximum allowable amount of Vitamin D in an infant formula is 676 I.U. per liter, and the minimum allowable amount of Vitamin D is 274 I.U. per liter, the range being based upon a standard 20 calorie/ounce formula (equivalent I.U./liter ranges must be adjusted for other base infant formulas, e.g. 24 calorie/ounce). It should be understood, however, that the Vitamin D concentrations for purposes of defining the methods and compositions of the present invention can be higher, the same as, or even lower than the above-referenced guidelines, especially in those instances where the recommended Vitamin D levels are eventually modified in view of new learnings.

The terms "Vitamin D degradation rate" and "Vitamin D loss rate" are used interchangeably herein, and unless otherwise specified, mean an average rate of Vitamin D degradation or loss per week based upon 8 or more Vitamin D measurements (i.e. I.U./liter) taken on each of two or more batches at reasonably spaced intervals throughout the first 12 months after a formula is aseptically packaged. The method relative standard deviation (RSD) must be no greater than 5%. Also as used herein, the term "improved Vitamin D degradation rate" refers to a comparison of the Vitamin D degradation rate as defined herein of the selected aseptically packaged formula relative to a similar formula packaged by conventional retort methods.

The term "retort packaging" and "retort sterilizing" are used interchangeably herein, and unless otherwise specified, refer to the common practice of filling a container, most typically a metal can or other similar package, with formula and then subjecting the formula-filled package to the necessary heat sterilization step, to form a sterilized, retort packaged, formula product.

The term "aseptic packaging" as used herein, unless otherwise specified, refers to the manufacture of a packaged product without reliance upon the above-described retort packaging step, wherein the formula and package are sterilized separately prior to filling, and then are packaged, formula product.

In a stability study to evaluate the aseptically packaged liquid nutritional formula of the present invention, the aseptically packaged product of the present invention had a shelf-life Vitamin D loss rate of approximately 3.6 I.U./liter/week while a similar formula that was retort packaged had a shelf-life Vitamin D loss rate of approximately 5.1 I.U./liter/week, representing an improvement in shelf-life Vitamin D stability as measured by a decreased loss of approximately 1.5 I.U./liter/week or a shelf-life Vitamin D degradation rate that is about 29% less than the baseline retort formula. (The rate of about 3.6 I.U./liter/week represents an average of data measured for storage in dark and light conditions, as discussed in detail hereinafter and as presented in Table VII.). While these numbers represent a particular measured improvement in Vitamin D shelf-life stability, the compositions and methods of the present invention are meant to encompass various other improvements in Vitamin D shelf-life stability (i.e., various other decreases in Vitamin D loss rates). Moreover, while the numbers were measured for an extensively hydrolyzed protein liquid infant formula, the compositions and methods of the present invention are meant to also encompass extensively hydrolyzed protein liquid nutritional formulas for children over one year of age and for adults.

The liquid nutritional formulas for use in preparing the aseptically prepared compositions of the present invention can be prepared or manufactured using any of a variety of techniques well known to those of ordinary skill in the formulation art. For example, a typical process involves the preparation of a slurry from one or more fluid combinations that may contain water and one or more of the following: carbohydrates, extensively hydrolyzed protein, lipids, stabilizers, vitamins and minerals. This slurry is typically emulsified, deaerated, homogenized and cooled to form a sterilized formula, and then aseptically packaged to form a sterilized, aseptically packaged liquid nutritional formula. Various other solutions may be added to the slurry at most any time before, during, or after processing.

Suitable aseptic packaging techniques for use in the compositions and methods of the present invention can include any of the well known aseptic packaging methods disclosed in the formulation arts for preparing liquid nutritional formulas, all of which are generally directed to the sealing or filling of a sterilized liquid into a sterilized, air-tight container. Many variations on the basic method exist and are well known to those of ordinary skill in the formulation art, non-limiting examples of which are described in U.S. Pat. No. 6,096,358 (Murdick et al.); U.S. Pat. No. 6,227,261 (Das et al.); and U.S. Pat. No. 6,371,319 (Yeaton et al.), which descriptions are incorporated herein by reference.

The container for use in the compositions and methods of the present invention can be any container suitable for use with liquid nutritional products and also capable of withstanding aseptic processing conditions (e.g., sterilization). Non-limiting examples of such containers include bags, plastic bottles or containers, pouches, metal cans or other containers, glass bottles, juice box-type containers, foil pouches, plastic bags sold in boxes, or any other container meeting the above-described criteria. Preferred are plastic containers, more preferably a resealable multi-dose plastic container, a non-limiting example of which is a 32 ounce plastic bottle with a foil seal and a plastic resealable cap.

The container for use in the compositions and methods of the present invention, and therefore used in the aseptic packaging step described herein, is typically sterilized prior to being filled with its sterilized contents. The container is most typically sterilized by the application of hydrogen peroxide or other suitable disinfectant to the inside surface of the container. The hydrogen peroxide or other disinfectant is often applied in an atomized mist. After a disinfectant is applied, the container may be transported along a conveyor system during which time the container may be subjected to one or more sprayings of hot sterilized air, preferably hot, sterilized, dry air. The container is then preferably injected with nitrogen gas. The aseptically prepared container is then aseptically filled with sterilized product and sealed.

A liquid nutritional formula that is to be packaged aseptically is preferably prepared in the same or substantially the same way as a product that is to be retort packaged, but for the final packaging preparation sequence. In other words, once a liquid nutritional product is formulated, it will only then be treated differently in preparation for the packaging process, depending upon the selection of retort or aseptic packaging. For aseptic packaging, the formula is typically further heat treated to a temperature of from about 160° F. to about 185° F. as a preheating step, subjected to ultra high temperature treatment in the range of from about 280° to about 300° F. for from about 5 to about 15 seconds, to sufficiently reduce the bioburden to allow the products to maintain safe levels, i.e., commercially sterile, over an extended shelf-life of the finished product exceeding about 12 months. The treated formula is then homogenized at 1000 psi or higher and aseptically packaged.

As discussed above, the nutritional guidelines for infant formulas are set forth in the Infant Formula Act, 21 U.S.C. section 350(a). Most generally, a nutritional formula will contain a source of protein, carbohydrate, lipid, vitamins and minerals.

Suitable carbohydrates, lipids and proteins for use in the compositions and methods of the present invention include any of the materials well known to those skilled in the art of making liquid nutritional formulas, including formulas that contain extensively hydrolyzed protein. For suitable protein sources, non-limiting examples include milk, soy, rice, animal or meat, vegetable (e.g., pea, potato), egg (e.g., egg albumen), gelatin, and fish. Non-limiting examples of suitable intact proteins suitable for use in preparing an extensively hydrolyzed protein for use herein include soy based, milk based, casein protein, whey protein, rice protein, beef collagen, pea protein, potato protein, and combinations thereof.

Non-limiting examples of suitable protein hydrolysates for use herein include soy protein hydrolysate, casein protein hydrolysate, whey protein hydrolysate, rice protein hydrolysate, potato protein hydrolysate, fish protein hydrolysate, egg albumen hydrolysate, gelatin protein hydrolysate, combinations of animal and vegetable protein hydrolysates, and combinations thereof. Protein may also be provided in the form of free amino acids.

The liquid nutritional formula for use herein is preferably supplemented with various free amino acids in order to provide a more nutritionally complete and balanced formula, nonlimiting examples of which include L-tryptophan, L-tyrosine, L-cystine, taurine, L-methionine, L-arginine, and L-carnitine.

Extensively hydrolyzed proteins (protein hydrolysates) for use in the methods and compositions of the present invention are proteins that have been hydrolyzed and broken down into shorter peptide fragments and amino acids, wherein the resulting degree of hydrolysis is at least about 20%, preferably from about 20% to about 80%. The term "extensively hydrolyzed" as used herein, means a protein hydrolysate having a minimum degree of hydrolysis of at least about 20%, with the preferred ranges being referenced above. In the broadest sense, a protein has been hydrolyzed when one or more amide bonds have been broken. Breaking of amide bonds may occur unintentionally or incidentally during manufacture, for example due to heating or shear, but for purposes of the methods and compositions of the present invention, the term "hydrolyzed protein" simply means a protein which has been processed or treated in a manner intended to break amide bonds. Intentional hydrolysis may be affected, for example, by treating an intact protein with enzymes or acids.

The terms "protein hydrolysates" or "hydrolyzed protein" are used interchangeably herein and refer to extensively hydrolyzed proteins, wherein the degree of hydrolysis is at least about 20%, preferably from about 20% to about 80%, more preferably from about 30% to about 80%, even more preferably from about 40% to about 60%. The degree of hydrolysis is the extent to which peptide bonds are broken by a hydrolysis method. The degree of protein hydrolysis for purposes of characterizing the extensively hydrolyzed protein component of the present invention is easily determined by one of ordinary skill in the formulation arts by quantifying the amino nitrogen to total nitrogen ratio (AN/TN) of the protein component of the selected formulation. The amino nitrogen component is quantified by USP titration methods for determining amino nitrogen content, while the total nitrogen component is determined by the Tecator Kjeldahl method, all of which are well known methods to one of ordinary skill in the analytical chemistry art.

When a peptide bond in a protein is broken by enzymatic hydrolysis, one amino group is released for each peptide bond broken, causing an increase in the amino nitrogen. It should be noted that even non-hydrolyzed protein would contain some exposed amino groups, and have an AN/TN ratio of greater than zero percent. Hydrolyzed proteins will also have a different molecular weight distribution than the non-hydrolyzed proteins from which they were formed. The functional and nutritional properties of hydrolyzed proteins can be affected by the different size peptides. A molecular weight profile is usually given by listing the percent by weight of particular ranges of molecular weight (in Daltons) fractions (e.g., 2,000 to 5,000 Daltons, greater than 5,000 Daltons). As previously mentioned, persons who exhibit sensitivity to whole or intact proteins can benefit from consumption of nutritional formulas containing extensively hydrolyzed proteins. Such sensitive persons may especially benefit from the consumption of a hypoallergenic formula.

According to its August 2000 Policy Statement, the American Academy of Pediatrics defines a hypoallergenic formula as one which in appropriate clinical studies demonstrates that it does not provoke reactions in 90% of infants or children with confirmed cow's milk allergy with 95% confidence when given in prospective randomized, double-blind, placebo-controlled trials. In order for a formula to meet the requirements for hypoallergenicity, the protein used within that formula would need to be extensively hydrolyzed. A formula containing such extensively hydrolyzed protein is likely to exhibit the Vitamin D degradation problems discussed in detail above, and will benefit from the methods and formulas of the invention, as described herein. For example, in order to meet the definition of a hypoallergenic formula, a protein with a degree of hydrolysis of from 20% to 80% may be utilized, more preferably a protein with a degree of hydrolysis of from 30% to 80%, even more preferably from about 40% to about 60%, may be utilized. The formulations of the present invention are preferably hypoallergenic in accordance with the above-defined criteria.

The liquid nutritional formula of the present invention is preferably substantially free of intact proteins. In this context, the term "substantially free" means that the preferred embodiments herein comprise sufficiently low concentrations of intact protein to thus render the formula hypoallergenic. The extent to which a formula in accordance with the preferred embodiments of the present invention is substantially free of intact proteins, and therefore hypoallergenic, is determined by the August 2000 Policy Statement, the American Academy of Pediatrics in which a hypoallergenic formula is defined as one which in appropriate clinical studies demonstrates that it does not provoke reactions in 90% of infants or children with confirmed cow's milk allergy with 95% confidence when given in prospective randomized, double-blind, placebo-controlled trials.

Many hypoallergenic formulas are known or otherwise marketed and available to consumers, including Alimentum□ protein hydrolysate infant formula with iron (manufactured by Ross Products Division of Abbott Laboratories) and Nutrimigen□ protein hydrolysate infant formula (manufactured by Mead Johnson Company).

Non-limiting examples of carbohydrate materials suitable for use herein include hydrolyzed or intact, naturally or chemically modified, starches sourced from corn, tapioca, rice or potato, in waxy or non-waxy forms. Non-limiting examples of suitable carbohydrates include various hydrolyzed starches characterized as hydrolyzed cornstarch, maltodextrin, maltose, corn syrup, dextrose, corn syrup solids, glucose, and various other glucose polymers and combinations thereof. Non-limiting examples of other suitable carbohydrates include those often referred to as sucrose, lactose, fructose, high fructose corn syrup, indigestible oligosaccharides such as fructosoligosaccharides (FOS), and combinations thereof.

Examples of fat or lipid materials suitable for use in the compositions and methods of the present invention include any lipid that is otherwise suitable for consumption by humans, non-limiting examples of which include coconut oil; soy oil, corn oil, olive oil, safflower oil, high oleic safflower oil, MCT oil (medium chain triglycerides), sunflower oil, high oleic sunflower oil, palm oil, palm olein, canola oil, and combinations thereof.

Other suitable lipid materials for use herein include arachidonic acid (ARA), docosahexaenoic acid (DHA), and combinations thereof. These materials have been reported to have beneficial effects in infants, including enhanced brain and vision development. These materials and their benefits are described in U.S. Pat. Nos. 5,492,938; 5,374,657; and 5,550,156 (Kyle et al.) Non-limiting examples of lipid sources of arachidonic acid and docosahexaenoic acid include marine oil, egg derived oils, fungal oil and algal oil. Marine oil is available from Mochida International of Tokyo, Japan. DHA is available from Martek Biosciences Corporation of Columbia, Md., U.S.A Arachidonic acid is available from Genzyme Corporation of Cambridge, Mass., U.S.A. and from Martek Biosciences Corporation of Columbia, Md., U.S.A.

The liquid nutritional formula for use in the compositions and methods of the present invention preferably include other optional materials, non-limiting examples of which include nucleotides, vitamins, minerals, and combinations thereof. Non-limiting examples of suitable nucleotides include adenosine 5'-monophosphate, cytidine 5'-monophosphate, disodium guanosine 5'-monophosphate, disodium uridine 5'-monophosphate, and combinations thereof. Non-limiting examples of suitable vitamins include Vitamin A, Vitamin E, Vitamin K, thiamine, riboflavin, Vitamin B6, Vitamin B12, niacin, folic acid, pantothenic acid, biotin, choline, inositol, and combinations thereof. Non-limiting examples of suitable minerals include calcium, phosphorus, magnesium iron, zinc, manganese, copper, iodine, selenium, sodium, potassium, chloride, and combinations thereof.

The liquid nutritional formula for use in the compositions and methods of the present invention preferably comprises Vitamin C. The Vitamin C is preferably added during formulation at a concentration exceeding about 300 mg per liter, such that the initial concentration of Vitamin C in the finished product, i.e., the aseptically packaged liquid nutritional formula of the present invention, will be at least about 300 mg per liter during the shelf-life of the packaged formula.

For the various ingredients in the aseptically packaged liquid nutritional formulas herein, the concentration or use of the ingredients, whether essential or optional, should be added at a level or in a manner that renders the resulting product safe and effective for its intended use. For many liquid nutritional formulas, especially infant formulas, the concentration should ideally adhere to any regional guidelines for the selected formula in the defined user population. For example, in the United States, nutritional guidelines for most infant formulas are set forth in the Infant Formula Act, 21 United States Code (U.S.C.) Section 350(a). It should be understood, however, that the concentration of such ingredients for purposes of defining the various embodiments of the present invention can be higher, the same as, or even lower than any regional guidelines, including the above-referenced guidelines, especially in those instances where the recommended ingredient levels are eventually modified.

The liquid nutritional formula for use herein may further comprise a thickening agent, many suitable examples of which are known in the formulation arts. Non-limiting examples of suitable thickening agents include gum arabic, gum ghatti, gum karaya, gum tragacanth, agar, furcellaran, guar gum, xanthan gum, gellan gum, locust bean gum, pectin, low methoxyl pectin, gelatin, microcrystalline cellulose, CMC (sodium carboxymethylcellulose), methylcellulose hydroxypropyl methyl cellulose, hydroxypropyl cellulose, dextran, carrageenans, and combinations thereof. The selected amount of thickening agent will vary depending upon factors such as the particular stabilizer selected, other ingredients in the formula, and the stability and viscosity of the targeted formula.

Thickening agents such as gums have been found to be especially useful in selected infant formulas to raise viscosity to thus reduce the occurrence of spit-up in some infants. Nonlimiting examples of suitable gums for use in this capacity include gum arabic, gum ghatti, gum karaya, gum tragacanth, agar, furcellaran, guar gum, gellan gum, locust bean gum, and combinations thereof. Alternatively, starches such as rice can be used to elevate viscosities. Formula for reducing infant spit-up is described in U.S. Pat. No. 6,099,871 (Martinez), which description is incorporated herein by reference.

Emulsifying agents are also suitable for use in the methods and compositions of the present invention, the selection and use of which is well within the ordinary skill of one in the formulation arts. These skilled artisans will often select and use an emulsifying agent in these liquid nutritional formulas to help provide sufficient stability of the targeted emulsion system, such selection being at least partially dependent upon the other selected ingredients in the system.

EXAMPLE

The following study was performed on a composition of the present invention to evaluate vitamin stability of an aseptically packaged liquid nutritional formula relative to the vitamin stability of a retort packaged liquid nutritional formula. Among the vitamins evaluated (Vitamins A, $B_1$, $B_2$, C, and D), only Vitamin D showed significantly improved stability in the aseptically packaged formula of the present invention as compared to the same formula packaged by conventional retort methods. The stability study and resulting data are hereinafter described in greater detail.

Stability Study of Extensively Hydrolyzed Protein Liquid Infant Formula

As noted above, a study was conducted to assess the stability of Vitamin D in an aseptically packaged, extensively hydrolyzed protein liquid nutritional formula. Three batches of extensively hydrolyzed protein liquid infant formula were prepared. After production of the same formula (i.e., see Table 1) used in all three batches, each batch was split into pairs, and then one member of each pair was subjected to aseptic packaging (method of the present invention) while the other paired member was subjected to retort packaging (control). The same formula as described in Table 1 was used in all three paired batches and was prepared in accordance with methods well known to those of ordinary skill in the art for making liquid nutritional formulas.

A portion of the formula for each of the three batches was then placed in individual 32 oz. metal cans and subjected to terminal sterilization (in this case, retort sterilization). The remaining formula for the other batches was then further processed, sterilized, and then packaged aseptically into 32 ounce plastic bottles with a foil seal, and a plastic cap. The aseptically packaged bottles were further separated into paired groups, one member of each pair being stored under light conditions, and the other paired member stored under dark conditions. The control products (i.e., retort packaged) from the three initially paired batches were stored along with the subsequently paired, aseptically packaged sets stored under dark conditions.

Prior to packaging, the base formula (see Table 1) used in all of the paired batches that were eventually to be aseptically packaged were first heat treated and homogenized to form a sterilized formula ready for packaging. The sterilized formula was aseptically packaged into 32 ounce plastic bottles that had been aseptically prepared. The 32 ounce plastic bottles had been sterilized by the use of the hydrogen peroxide method. This method consisted of providing a plastic bottle, spraying the plastic bottle with atomized hydrogen peroxide, subjecting the container to sprayings of hot, dry, sterilized air, and injection with nitrogen gas. After filling, commercial type plastic labels were placed on the bottles.

The sample formulas were stored for periodic testing over 12 month periods under either dark or light conditions as described hereinafter.

The samples to be tested for Vitamin D were stored in either light or dark conditions. For the light samples, these were stored on shelves with fluorescent light bulbs directly above the bottles such that a light intensity of 90-100 foot-candles was delivered at shelf levels, with a 15% or less light gradient four inches above the shelf. The light intensity was tested with a calibrated light photometer on a monthly basis.

For the formula samples subjected to standard (dark) conditions, which included samples to be tested for Vitamin D as well as other vitamins, the formulas were stored on shelves in a room with a controlled temperature range of 72±2° F. The room had low lighting for approximately 10 hours per day, but the light intensity reaching the bottles on the shelf was minimal.

For the formula samples subjected to light storage conditions and tested for vitamins other than Vitamin D, these samples were stored under light conditions under ambient temperatures.

It should be noted, however, that the light samples selected from the first batch of formula (there were three formula batches run for this study) were stored under dark conditions for one month prior to being moved to light conditions that were just being constructed for use in the study, whereas those light samples selected from the second and third batches were stored under light conditions within several days of packaging. For all sample formulas, the zero time values as set forth in the tables represent those values from formulas submitted for analysis in the study prior to initiating either dark or light storage.

As for each of the control formulas (retort packaged in 32 oz. metal cans), each was stored along with its corresponding aseptically packaged formula stored under dark conditions.

The three formula batches, separated into various pairs as described above, were stored for 52 weeks, and data collected on the amounts of Vitamins A, B1, B2, C and D at various intervals. Data were collected for Vitamins A and D at more frequent intervals than for Vitamins B1, B2 and C. Results of the analyses appear in Tables II through VI. Results of a statistical analysis of the analytical data appear in Table VII. The average % loss per week of each vitamin tested is reported for the aseptically packaged product stored under light conditions, the aseptically packaged product stored under dark conditions, and the retort packaged product. The last column in Table VII indicates whether the loss rates are significantly different (p value>0.05 for pairwise comparisons).

Results for Vitamin A analysis appear in Table II. The amount of Vitamin A in the product was analyzed using normal phase HPLC determination of Vitamin A Palmitate. As reported in Table VII, the aseptically packaged product (under both light and dark conditions) lost Vitamin A at approximately twice the rate as the retort packaged product. It is believed that the greater quantity of oxygen in the headspace of the plastic bottle contributed to this increased loss rate. As reported in Table VII, the difference between the Vitamin A loss rate in the aseptically packaged product stored under light conditions and the loss rate in the aseptically packaged product stored under dark conditions was not statistically significant.

Results for the Vitamin B1 analysis of the paired batches are set forth in Table III. The amount of Vitamin B1 in the product was analyzed by reversed phase/ion-pairing HPLC using fluorescence detection after post-column derivatization of Thiamine (Vitamin B1) to Thiochrome. As set forth in Table VII, the difference between the Vitamin B1 loss rate in the aseptically packaged product stored under light conditions and the loss rates in the aseptically packaged product stored under dark conditions and the retort packaged product was statistically significant. The Vitamin B1 loss rate of the aseptically packaged product stored under dark conditions was not significantly different from the loss rate of the retort packaged product. The aseptically packaged product stored under light conditions lost relatively more Vitamin B1 than the aseptically packaged product stored under dark conditions.

Results for Vitamin B2 analysis appear in Table IV. The amount of Vitamin B2 in the product was analyzed by reversed phase/ion-pairing HPLC using fluorescence detection. As reported in Table VII, the difference between the loss rate in the aseptically packaged product stored under light conditions and the loss rates in both the aseptically packaged product stored under dark conditions or the retort packaged product were statistically significant. There was no statistically significant difference between the loss rates in the aseptically packaged product stored under dark conditions and in the retort packaged product.

Results for Vitamin C analysis appear in Table V. The amount of Vitamin C in the Vitamin C loss rate in the aseptically packaged product stored under dark conditions and the retort packaged product (the only two products for which Vitamin C data was collected) was not significantly different.

Results for Vitamin D analysis appear in Table VI. The amount of Vitamin D in the product was analyzed by normal phase HPLC determination of Vitamin $D_3$. The first batch was fortified with 780 IU/L Vitamin D, whereas the second and third batches were fortified with 750 IU/L Vitamin D. The aseptically packaged product lost Vitamin D at a rate that was only about 70% of the rate of loss of the retort packaged product. This was true for both the aseptically packaged product stored under light conditions and that stored under dark conditions. As reported in Table VII, the difference in the Vitamin D loss rate in the aseptically packaged product (stored under light and under dark conditions) and the retort packaged product was statistically significant. Taking an average of the Vitamin D loss rate for the aseptically packaged product stored under light conditions (3.46534 I.U/liter/week) and the Vitamin D loss rate for the aseptically packaged product stored under dark conditions (3.77337 I.U./liter/week) yields approximately 3.6 I.U./liter/week. The Vitamin D loss rate of the aseptically packaged product was thus about 3.6 I.U./liter/week versus a loss rate of approximately 5.1 I.U./liter/week for the retort packaged product. Thus, the aseptically packaged, extensively hydrolyzed protein formula had approximately a 30% reduction in Vitamin D degradation as compared to the baseline (i.e., the same formula but retort packaged in a metal can).

While the invention has been described herein with reference to particular embodiments, it is to be understood that it is not intended to limit the invention to the specific forms disclosed. On the contrary, it is intended to cover all modifications and alternative forms falling with the spirit and scope of the invention.

All percentages, parts and ratios, as used herein, are by weight of the total or designated composition, unless otherwise specified. All such weights as they pertain to listed ingredients are based on the specific ingredient level and, therefore, do not include solvents, carriers, by-products, filler or other minor ingredients that may be included in commercially available materials, unless otherwise specified.

TABLE I

Liquid Nutritional Formula with Vitamin D and Extensively Hydrolyzed Protein

| Ingredient | Quantity/45,359 kg |
|---|---|
| Water | 39,280 kg |
| Sucrose | 2,013 kg |
| Casein Hydrolysate (50–60% hydrolyzed) | 1,043 kg |
| Modified Tapioca Starch | 998 kg |
| Safflower Oil | 658 kg |
| Fractionated Coconut Oil | 567 kg |
| Soy Oil | 476 kg |
| Calcium Citrate | 77 kg |
| Calcium Phosphate Dibasic | 50 kg* |
| Carrageenan | 36–45 kg |
| Potassium Phosphate Dibasic | 26 kg* |
| Ascorbic Acid | 22–26 kg |
| Magnesium Chloride | 18 kg* |
| Calcium Hydroxide | 16 kg* |
| Potassium Citrate | 16 kg* |
| Sodium Chloride | 15 kg* |
| L-Cystine Dihydrochloride | 12 kg |
| Potassium Chloride | 11 kg |
| L-Tyrosine | 5.0 kg |
| Choline Chloride | 3.4 kg |
| L-Tryptophan | 2.9 kg |
| Ferrous Sulfate | 2.8 kg |
| Taurine | 2.4 kg |
| m-Inositol | 1.8 kg |
| Zinc Sulfate | 1.3 kg |
| Alpha-Tocopheryl Acetate | 1.1 kg |
| L-Carnitine | 650 gm |
| Niacinamide | 522 gm |
| Calcium Pantothenate | 313 gm |
| Riboflavin | 168 gm |
| Cupric Sulfate | 151 gm |
| Vitamin Palmitate | 120 gm |

TABLE I-continued

Liquid Nutritional Formula with Vitamin D and Extensively Hydrolyzed Protein

| Ingredient | Quantity/45,359 kg |
|---|---|
| Thiamine Chloride Hydrochloride | 81 gm |
| Pyridoxine Hydrochloride | 33 gm |
| Folic Acid | 11 gm |
| Potassium Iodide | 8.7 gm |
| Phylloquinone | 7.2 gm |
| Biotin | 3.2 gm |
| Sodium Selenate | 1.9 gm |
| Vitamin D3 | 0.86 gm |
| Cyanocobalamin | 0.25 gm |

*approximate values can vary or otherwise require adjustment during formulation

TABLE II

VITAMIN A CONTENT (IU/L)

| Product/ | Batch 1 | | | Batch 2 | | | Batch 3 | | |
|---|---|---|---|---|---|---|---|---|---|
| Week | R | A-D | A-L | R | A-D | A-L | R | A-D | A-L |
| 0 | 2425 | 2694 | 2694 | 2755 | 3096 | 3096 | 2673 | 3034 | 3034 |
| 13 | — | — | 2415 | — | — | 2786 | — | — | 2704 |
| 26 | 2281 | 2425 | 2250 | 2621 | 2776 | 2456 | 2508 | 2704 | 2466 |
| 39 | 2208 | 2239 | 2291 | 2601 | 2642 | 2518 | 2497 | 2590 | 2466 |
| 43 | 2281 | 2322 | 2250 | 2415 | 2559 | 2487 | 2415 | 2466 | 2466 |
| 48 | 2260 | 2250 | 2291 | 2456 | 2549 | 2642 | 2415 | 2487 | 2487 |
| 52 | 2270 | 2291 | 2250 | 2539 | 2632 | 2487 | 2487 | 2570 | 2487 |

R = retort packaged product
A-D = aseptically packaged product, stored under dark conditions
A-L = aseptically packaged product, stored under light conditions
"—" indicates that no data was collected on a particular week

TABLE III

VITAMIN B1 CONTENT (mg/L)

| Product/ | Batch 1 | | | Batch 2 | | | Batch 3 | | |
|---|---|---|---|---|---|---|---|---|---|
| Week | R | A-D | A-L | R | A-D | A-L | R | A-D | A-L |
| 0 | 1.62 | 1.66 | 1.66 | 1.6 | 1.64 | 1.64 | 1.29 | 1.63 | 1.63 |
| 13 | — | — | 1.69 | — | — | 1.67 | — | — | 1.63 |
| 26 | 1.67 | 1.71 | 1.7 | 1.61 | 1.66 | 1.57 | 1.57 | 1.64 | 1.58 |
| 39 | — | — | 1.55 | — | — | 1.53 | — | — | 1.51 |
| 52 | 1.55 | 1.6 | 1.44 | 1.57 | 1.54 | 1.4 | 1.44 | 1.52 | 1.42 |

R = retort packaged product
A-D = aseptically packaged product, stored under dark conditions
A-L = aseptically packaged product, stored under light conditions
"—" indicates that no data was collected on a particular week

TABLE IV

VITAMIN B2 CONTENT (mg/L)

| Product/ | Batch 1 | | | Batch 2 | | | Batch 3 | | |
|---|---|---|---|---|---|---|---|---|---|
| Week | R | A-D | A-L | R | A-D | A-L | R | A-D | A-L |
| 0 | 3.75 | 3.67 | 3.67 | 3.8 | 3.79 | 3.79 | 3.17 | 3.77 | 3.77 |
| 13 | — | — | 3.8 | — | — | 3.69 | — | — | 3.3 |
| 26 | 3.95 | 3.84 | 3.58 | 3.85 | 3.81 | 3.13 | 3.64 | 3.72 | 3.18 |
| 39 | — | — | 3.15 | — | — | 2.89 | — | — | 2.78 |
| 52 | 3.88 | 3.84 | 3.05 | 3.61 | 3.67 | 2.71 | 3.62 | 3.68 | 2.7 |

R = retort packaged product
A-D = aseptically packaged product, stored under dark conditions TABLE IV-continued VITAMIN B2 CONTENT (mg/L)

| Product/ | Batch 1 | | | Batch 2 | | | Batch 3 | | |
|---|---|---|---|---|---|---|---|---|---|
| Week | R | A-D | A-L | R | A-D | A-L | R | A-D | A-L |

A-L = aseptically packaged product, stored under light conditions
"—" indicates that no data was collected on a particular week

TABLE V

VITAMIN C CONTENT (mg/L)

| Product/ | Batch 1 | | | Batch 2 | | | Batch 3 | | |
|---|---|---|---|---|---|---|---|---|---|
| Week | R | A-D | A-L | R | A-D | A-L | R | A-D | A-L |
| 0 | 390 | 344 | — | 410 | 397 | — | 406 | 388 | — |
| 26 | 390 | 322 | — | 410 | 384 | — | 384 | 368 | — |
| 52 | 394 | 337 | — | 427 | 402 | — | 408 | 366 | — |

R = retort packaged product
A-D = aseptically packaged product, stored under dark conditions
A-L = aseptically packaged product, stored under light conditions
"—" indicates that no data was collected on a particular week

TABLE VI

VITAMIN D CONTENT (IU/L)

| Product/ | Batch 1 | | | Batch 2 | | | Batch 3 | | |
|---|---|---|---|---|---|---|---|---|---|
| Week | R | A-D | A-L | R | A-D | A-L | R | A-D | A-L |
| 0 | 612 | 663 | 663 | 658 | 683 | 683 | 611 | 664 | 664 |
| 4 | 639 | 715 | 639 | 589 | 650 | 738 | 562 | 616 | 623 |
| 9 | 644 | 697 | — | 664 | 709 | — | 599 | 649 | — |
| 13 | 623 | 688 | 636 | 560 | 607 | 612 | 525 | 589 | 590 |
| 26 | 528 | 623 | 573 | 509 | 566 | 567 | 471 | 546 | 546 |
| 39 | 451 | 559 | 534 | 439 | 531 | 535 | 421 | 508 | 499 |
| 43 | 419 | 533 | — | 410 | 521 | — | 390 | 499 | — |
| 46 | — | — | 507 | — | — | 510 | — | — | 496 |
| 48 | 396 | 507 | 508 | 388 | 513 | 525 | 375 | 479 | 492 |
| 52 | 378.5 | 487 | 500 | 377 | 489 | 509 | 360 | 473 | 473 |

R = retort packaged product
A-D = aseptically packaged product, stored under dark conditions
A-L = aseptically packaged product, stored under light conditions
"—" indicates that no data was collected on a particular week

TABLE VII

AVERAGE % LOSS[1] OF VITAMINS PER WEEK[2]

| Product/ Analyzed for | Retort Packaged | Aseptically Packaged Dark | Aseptically Packaged Light |
|---|---|---|---|
| Vitamin A (IU/L) | 0.17195[a] | 0.36077[b] | 0.33163[b] |
| Vitamin B1 (mg/L) | +0.00032[a] | 0.00173[a] | 0.00445[b] |
| Vitamin B2 (mg/L) | +0.00249[a] | 0.00026[a] | 0.01920[b] |
| Vitamin C (mg/L) | +0.14703[a] | 0.15342[a] | — |
| Vitamin D (IU/L) | 5.11960[a] | 3.77337[b] | 3.46534[b] |

[a,b]Rates of loss that share a superscript letter are not significantly different (p value > 0.05 for pairwise comparisons).
[1]All rates represented losses except for those indicated with "+".
[2]Rates calculated using the intercepts (0 time estimates) and average slopes (per week rates of loss) for the packaging/container combinations average across the three batches.

What is claimed is:

1. A method comprising the steps of:
   (a) sterilizing a liquid nutritional formula containing Vitamin D and extensively hydrolyzed protein having a degree of hydrolysis of at least about 20%;
   (b) sterilizing a plastic container; and then
   (c) aseptically packaging the sterilized liquid nutritional formula in the sterilized plastic container, to produce a sterilized, aseptically packaged, liquid nutritional formula containing extensively hydrolyzed protein and Vitamin D, which has an average vitamin D degradation reduction rate of at least about 20%.

2. The method of claim 1, wherein the plastic container is a resealable multi-dose container.

3. The method of claim 1, wherein the extensively hydrolyzed protein has a degree of hydrolysis of from about 30% to about 80%.

4. The method of claim 1, wherein the extensively hydrolyzed protein has a degree of hydrolysis of from about 40% to about 60%.

5. The method of claim 1, wherein the liquid nutritional formula of step (a) further comprises Vitamin C.

6. The method of claim 1, wherein the sterilized, aseptically packaged, liquid nutritional formula has an average Vitamin D degradation rate reduction of from about 20% to about 40%.

7. The method of claim 1, wherein the sterilized, aseptically packaged, liquid nutritional formula has an average Vitamin D degradation rate reduction of from about 25% to about 35%.

8. The method of claim 1, wherein the sterilized, aseptically packaged, liquid nutritional formula containing extensively hydrolyzed protein and Vitamin D is an infant nutritional formula.

9. The method of claim 1, wherein the sterilized, aseptically packaged, liquid nutritional formula is not subjected to heat sterilization after packaging.

10. The method of claim 1, wherein the sterilized, aseptically packaged, liquid nutritional formula is substantially free of intact proteins.

11. A sterilized, aseptically packaged, liquid nutritional formula comprising Vitamin D and extensively hydrolyzed protein having a degree of hydrolysis of at least about 20%, wherein the packaged formula is prepared by
   (a) sterilizing a liquid nutritional formula containing Vitamin D and extensively hydrolyzed protein, said protein having a degree of hydrolysis of at least about 20%;
   (b) sterilizing a plastic container; and then
   (c) aseptically packaging the sterilized liquid nutritional formula in the sterilized plastic container, to produce a sterilized, aseptically packaged, liquid nutritional formula containing extensively hydrolyzed protein and Vitamin D, which has an average vitamin D degradation reduction rate of at least about 20%.

12. The sterilized, aseptically packaged, liquid nutritional formula of claim 11, wherein the plastic container is a resealable multi-dose container.

13. The sterilized, aseptically packaged, liquid nutritional formula of claim 11, wherein the extensively hydrolyzed protein has a degree of hydrolysis of from about 30% to about 80%.

14. The sterilized, aseptically packaged, liquid nutritional formula of claim 13, wherein the extensively hydrolyzed protein has a degree of hydrolysis of from about 40% to about 60%.

15. The sterilized, aseptically packaged, liquid nutritional formula of claim 11, wherein the liquid nutritional formula of step (a) further comprises Vitamin C.

16. The sterilized, aseptically packaged, liquid nutritional formula of claim 11, wherein the sterilized, aseptically packaged, liquid nutritional formula has an average Vitamin D degradation rate reduction of from about 20% to about 40%.

17. The sterilized, aseptically packaged, liquid nutritional formula of claim 11, wherein the sterilized, aseptically packaged, liquid nutritional formula has an average Vitamin D degradation rate reduction of from about 25% to about 35%.

18. The sterilized, aseptically packaged, liquid nutritional formula of claim 11, wherein the formula is an infant nutritional formula.

19. The sterilized, aseptically packaged, liquid nutritional formula of claim 11, wherein the formula is substantially free of intact proteins.

20. A composition comprising a sterilized aseptically packaged liquid nutritional formula, packaged in a plastic container, containing Vitamin D and extensively hydrolyzed protein, wherein the extensively hydrolyzed protein which has an average vitamin D degradation reduction rate of at least about 20%, has a degree of hydrolysis of at least about 20%.

21. The aseptically packaged composition of claim 20, wherein the plastic container is a resealable multi-dose container.

22. The aseptically packaged composition of claim 20, wherein the extensively hydrolyzed protein has a degree of hydrolysis of from about 30% to about 80%.

23. The aseptically packaged composition of claim 20, wherein the extensively hydrolyzed protein has a degree of hydrolysis of from about 40% to about 60%.

24. The aseptically packaged composition of claim 20, wherein the liquid nutritional formula comprises Vitamin C.

25. The aseptically packaged composition of claim 20, wherein the liquid nutritional formula has an average Vitamin D degradation rate reduction of from about 20% to about 40%.

26. The aseptically packaged composition of claim 20, wherein the liquid nutritional formula has an average Vitamin D degradation rate reduction of from about 25% to about 35%.

27. The aseptically packaged composition of claim 20, wherein the liquid nutritional formula is substantially free of intact proteins.

* * * * *